US008803788B2

(12) United States Patent
Hong et al.

(10) Patent No.: US 8,803,788 B2
(45) Date of Patent: Aug. 12, 2014

(54) METHOD OF DRIVING LIGHT-EMITTING DIODES BY CONTROLLING MAXIMUM AMOUNT OF LIGHT AND BACKLIGHT ASSEMBLY FOR PERFORMING THE METHOD

(75) Inventors: Hyun-Seok Hong, Daejeon (KR); Yo-Han Lee, Namyangju-si (KR); Dong-Lyoul Shin, Suwon-si (KR); Seung-Je Lee, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 290 days.

(21) Appl. No.: 12/606,955

(22) Filed: Oct. 27, 2009

(65) Prior Publication Data

US 2010/0123695 A1 May 20, 2010

(30) Foreign Application Priority Data

Nov. 17, 2008 (KR) ................................ 2008-113899

(51) Int. Cl.
*G09G 3/36* (2006.01)
*H05B 33/08* (2006.01)

(52) U.S. Cl.
CPC .......... *H05B 33/0869* (2013.01); *C09G 3/3406* (2013.01)
USPC .......................................................... 345/102

(58) Field of Classification Search
CPC ........................... G09G 3/3406; G09G 3/3413
USPC .......................................................... 345/102
See application file for complete search history.

(56) References Cited

U.S. PATENT DOCUMENTS

| | | | | |
|---|---|---|---|---|
| 6,069,676 | A * | 5/2000 | Yuyama | 348/655 |
| 7,504,612 | B2 * | 3/2009 | Yu et al. | 345/87 |
| 2002/0030449 | A1 * | 3/2002 | Okazaki et al. | 315/169.1 |
| 2002/0050974 | A1 * | 5/2002 | Rai et al. | 345/102 |
| 2005/0237401 | A1 * | 10/2005 | Tan et al. | 348/255 |
| 2005/0259439 | A1 * | 11/2005 | Cull et al. | 362/612 |
| 2006/0000963 | A1 * | 1/2006 | Ng et al. | 250/205 |
| 2006/0221047 | A1 * | 10/2006 | Tanizoe et al. | 345/102 |
| 2006/0245174 | A1 * | 11/2006 | Ashdown et al. | 362/85 |
| 2007/0080923 | A1 * | 4/2007 | Enomoto et al. | 345/102 |
| 2007/0139449 | A1 * | 6/2007 | Bergquist et al. | 345/691 |
| 2007/0216638 | A1 * | 9/2007 | Kojima | 345/102 |
| 2007/0222743 | A1 * | 9/2007 | Hirakata | 345/102 |
| 2007/0242459 | A1 * | 10/2007 | Nishigaki | 362/97 |

(Continued)

FOREIGN PATENT DOCUMENTS

| | | |
|---|---|---|
| CN | 101299325 | 11/2008 |
| JP | 07-131350 | 5/1995 |

(Continued)

*Primary Examiner* — Adam J Snyder
(74) *Attorney, Agent, or Firm* — Innovation Counsel LLP

(57) ABSTRACT

A method of driving light-emitting diodes (LEDs), a backlight assembly for performing the method, and a display apparatus having the backlight assembly are disclosed for various embodiments. For example, the backlight assembly includes a light source unit and a light source controller. The light source unit includes red, green, and blue LEDs generating red, green, and blue light, respectively. The light source controller detects amounts of the red, green, and blue light, respectively, to compare the actual light amount ratio of the red, green, and blue light with the reference light amount ratio. The light source controller controls the red, green, and blue LEDs, respectively, so that an actual light amount ratio becomes substantially identical to a reference light amount ratio when the actual light amount ratio is not identical to the reference light amount ratio.

19 Claims, 3 Drawing Sheets

(56) References Cited

U.S. PATENT DOCUMENTS

| | | | | |
|---|---|---|---|---|
| 2008/0245954 | A1* | 10/2008 | Chen | 250/214 R |
| 2008/0272701 | A1* | 11/2008 | Park et al. | 315/151 |
| 2009/0040172 | A1* | 2/2009 | Lien et al. | 345/102 |
| 2009/0066634 | A1* | 3/2009 | Isobe et al. | 345/102 |
| 2009/0224678 | A1* | 9/2009 | Wang | 315/158 |

FOREIGN PATENT DOCUMENTS

| | | | | | |
|---|---|---|---|---|---|
| JP | 2000-115801 A | | 4/2000 | | |
| JP | 2001-104306 | | 4/2001 | | |
| JP | 2003-187988 A | | 7/2003 | | |
| JP | 2004-029141 A | | 1/2004 | | |
| JP | 2005-259221 | | 9/2005 | | |
| JP | 2006-019263 | | 1/2006 | | |
| JP | 2007-286611 | | 11/2007 | | |
| JP | 2007-287386 | | 11/2007 | | |
| JP | 2008-117713 | | 5/2008 | | |
| KR | 10-2008-0020843 | * | 3/2008 | ............... | G09G 3/36 |
| KR | 1020080055585 A | | 6/2008 | | |
| WO | 2007/100207 | | 9/2007 | | |
| WO | 2007/148424 | | 12/2007 | | |
| WO | WO 2007148424 | * | 12/2007 | ............... | G09G 3/36 |

* cited by examiner

METHOD OF DRIVING LIGHT-EMITTING DIODES BY CONTROLLING MAXIMUM AMOUNT OF LIGHT AND BACKLIGHT ASSEMBLY FOR PERFORMING THE METHOD

CROSS REFERENCE TO RELATED APPLICATIONS

This application claims priority under 35 U.S.C. §119 to Korean Patent Application No. 2008-113899, filed on Nov. 17, 2008 in the Korean Intellectual Property Office (KIPO), the contents of which are herein incorporated by reference in their entirety.

BACKGROUND

1. Technical Field

Example embodiments of the present invention generally relate to a method of driving light-emitting diodes (LEDs), a backlight assembly for performing the method, and a display apparatus having the backlight assembly. More particularly, example embodiments of the present invention relate to a method of driving LEDs used in a liquid crystal display (LCD), a backlight assembly for performing the method, and a display apparatus having the backlight assembly.

2. Related Art

Generally, a liquid crystal display (LCD) apparatus includes an LCD panel displaying an image using light, and a backlight assembly disposed below (or behind) the LCD panel to provide light to the LCD panel.

The typical LCD panel includes a first substrate having a plurality of thin-film transistors (TFTs) and a plurality of pixel electrodes, a second substrate having a common electrode facing the first substrate, and a liquid crystal layer interposed between the first substrate and the second substrate.

The typical backlight assembly includes a light source unit generating light to provide light to the LCD panel. The light source unit may use rod-shaped cold cathode fluorescent lamps (CCFLs) as a light source generating light. Nowadays, however, the light source unit typically uses LEDs having low power consumption and high color reproduction as the light source. Generally, there are a red diode generating red light, a green diode generating green light, and a blue diode generating blue light in the LED. The red, green, and blue light generated from the red, green, and blue LEDs are mixed with each other to form white light. Here, color coordinates of the white light are determined according to amounts of the red, green, and blue light. To maintain the color coordinates of the white light, a display apparatus should detect the amounts of the red, green, and blue light generated from the red, green, and blue LEDs, and should feedback-control the red, green, and blue LEDs according to the detected amount of each of the red, green, and blue light.

When the LCD apparatus is exposed to a high temperature or a high humidity environment for a long time, however, transformation of the apparatus may be generated. In other words, an amount of light which a light sensor detects earlier at an equipped position becomes different from an amount of light which the light sensor detects when the apparatus is transformed due to being maintained in a high temperature or high humidity environment for a long time. The amount of light detected when the apparatus is transformed may not be accurate compared to that detected earlier. Thus, the red, green, and blue LEDs may be feedback-controlled using detected data that is inaccurate.

Similarly, when the red, green, and blue LEDs are feedback-controlled using the inaccurate data, the amounts of red, green, and blue light generated from the red, green, and blue LEDs may be changed, so that a reduction of luminance may be generated.

SUMMARY

Example embodiments of the present invention provide a method of driving light-emitting diodes (LEDs) capable of maintaining white color coordinates and preventing luminance variation. Example embodiments of the present invention also provide a backlight assembly for performing the above-mentioned method. Example embodiments of the present invention further provide a display apparatus having the above-mentioned backlight assembly.

According to one embodiment of the present invention, there is provided a method of driving LEDs. In the method, amounts of red, green, and blue light generated from a red LED, a green LED, and a blue LED, respectively, are detected. Then, whether or not an actual light amount ratio is substantially identical to a reference light amount ratio is determined by comparing the actual light amount ratio of the red, green, and blue light with the reference light amount ratio. Then, the red, green, and blue LEDs are controlled so that the actual light amount ratio becomes substantially identical to the reference light amount ratio when the actual light amount ratio is not identical to the reference light amount ratio.

In an example embodiment of the present invention, the reference light amount ratio may be a ratio of amounts of light of the red, green, and blue light corresponding to reference white color coordinates. Moreover, the reference light amount ratio may be a sequence of A:B:C corresponding to the red, green, and blue light, respectively, wherein $4.95 \leq A \leq 5.05$, $7.92 \leq B \leq 8.08$, and $2.97 \leq C \leq 3.03$. In an example embodiment of the present invention, in determining whether or not the actual light amount ratio is substantially identical to the reference light amount ratio, analog values of the amounts of the red, green, and blue light may be converted into digital conversion values of the amounts of the red, green, and blue light, respectively. Then, whether or not the actual light amount ratio is substantially identical to the reference light amount ratio is determined by comparing the actual light amount ratio of the digital conversion values of the amounts of the red, green, and blue light with the reference light amount ratio. In an example embodiment of the present invention, the digital conversion values of the amounts of the red, green, and blue light may be between a maximum value and a digital maximum conversion value. Here, the digital maximum conversion value may be between 1000 and 1023. In an example embodiment of the present invention, when the actual light amount ratio is not identical to the reference light amount ratio, at least one of the analog values of the amounts of the red, green, and blue light may have a value greater than the maximum of the reference analog value, so that at least one of the digital conversion values of the amounts of the red, green, and blue light may have the digital maximum conversion value. In an example embodiment of the present invention, in controlling the red, green, and blue LEDs, respectively, the digital conversion value of the amounts of red, green, and blue light may be reduced to have the same ratio, so that the digital conversion values of the amounts of the red, green, and blue light may have a value less than the maximum of the digital conversion value.

According to another embodiment of the present invention, a backlight assembly includes a light source unit and a light source controller. The light source unit includes red, green, and blue LEDs generating red, green, and blue light, respectively. The light source controller detects respective amounts of the red, green, and blue light, to compare the actual light amount ratio of the red, green, and blue light with the reference light amount ratio. The light source controller controls the red, green, and blue LEDs, respectively, so that an actual light amount ratio becomes substantially identical to a reference light amount ratio when the actual light amount ratio is not identical to the reference light amount ratio.

In an example embodiment of the present invention, the light source controller may include a red light sensor, a green light sensor, a blue light sensor, and a controller element. The red, green, and blue light sensors may respectively detect amounts of red, green, and blue light generated from the red, green, and blue LEDs, respectively. The controller element may control the red, green, and blue LEDs, respectively, so that the actual light amount ratio becomes substantially identical to the reference light amount ratio, when the actual light amount ratio is not identical to the reference light amount ratio, by comparing the actual light amount ratio of the red, green, and blue light with the reference light amount ratio. In an example embodiment of the present invention, the light source controller may include a red sensing amplification part, a green sensing amplification part, and a blue sensing amplification part. The red sensing amplification part may amplify an analog value of the amount of red light output from the red light sensor to provide the amplified analog value to the controller element. The green sensing amplification part may amplify an analog value of the amount of green light output from the green light sensor to provide the amplified analog value to the controller element. The blue sensing amplification part may amplify an analog value of the amount of blue light output from the blue light sensor to provide the amplified analog value to the controller element. In an example embodiment of the present invention, each of the red, green, and blue sensing amplification parts may amplify the analog values of the amounts of the red, green, and blue light, respectively, to have the same ratio. In an example embodiment of the present invention, each of the red, green, and blue sensing amplification part may include an operational amplifier, a first resistor, and a second resistor. The operational amplifier may include a first input terminal connected to each of the red, green, and blue light sensors and an output terminal connected to the controller element. The first resistor may be connected between a second input terminal of the operational amplifier and a ground terminal. The second resistor may be connected between a second input terminal of the operational amplifier and the output terminal of the operational amplifier. In an example embodiment of the present invention, the controller element may convert analog values of the amounts of the red, green, and blue light respectively input from the red, green, and blue sensing amplification parts into digital conversion values. The controller element may compare the actual light amount ratio of the digital conversion values of the amounts of the red, green, and blue light with the reference light amount ratio to determine whether or not the actual light amount ratio is substantially identical to the reference light amount ratio. In an example embodiment of the present invention, the digital conversion values of the amounts of the red, green, and blue light may be between a zero value and a digital maximum conversion value. In an example embodiment of the present invention, when the actual light amount ratio is not identical to the reference light amount ratio, at least one of the analog values of the amount of the red, green, and blue light may have a value greater than the maximum of the reference analog values corresponding to the maximum of the digital conversion values, so that at least one of the digital conversion values of the amounts of the red, green, and blue light may have the digital maximum conversion value. In an example embodiment of the present invention, the controller element may control the red, green, and blue sensing amplification parts, respectively, to reduce the analog values of the amounts of the red, green, and blue light respectively output from the red, green, and blue light sensors to have the same ratio, so that the analog values become less than the maximum of the reference analog values, when at least one of the digital conversion values of the amounts of the red, green, and blue light has the digital maximum conversion value. In an example embodiment of the present invention, the backlight assembly may further include a light amount ratio memory which stores the reference light amount ratio to provide the light source controller with the stored reference light amount ratio.

According to still another embodiment of the present invention, a display apparatus includes a display panel and a backlight assembly. The display panel displays an image using light. The backlight assembly is disposed below the display panel to generate light. The backlight assembly includes a light source unit and a light source controller. The light source unit includes red, green, and blue LEDs respectively generating red, green, and blue light. The light source controller detects the red, green, and blue light, respectively, to compare the actual light amount ratio of the red, green, and blue light. When the actual light amount ratio is not identical to the reference light amount ratio, the light source controller controls the red, green, and blue LEDs, respectively, so that the actual light amount ratio becomes substantially identical to the reference light amount ratio.

In an example embodiment of the present invention, the backlight assembly may further include an optical member disposed between the light source unit and the display panel. The light source controller may be disposed at an edge of a lower surface of the optical member facing the light source unit.

According to a method of driving an LED in accordance with an embodiment, a backlight assembly for performing the method, and a display apparatus having the backlight assembly, an actual ratio of red, green, and blue light generated from red, green, and blue LEDs is compared with a reference light amount ratio already stored to be maintained to be substantially identical to the reference light amount ratio, so that embodiments of the present invention may prevent luminance from decreasing or white color coordinates from being changed by warping of the LCD apparatus due to external conditions such as temperature or humidity.

BRIEF DESCRIPTION OF THE DRAWINGS

The above and other features and advantages of embodiments of the present invention will become more apparent by being described in detailed example embodiments thereof with reference to the accompanying drawings, in which.

DETAILED DESCRIPTION

Figure 1:
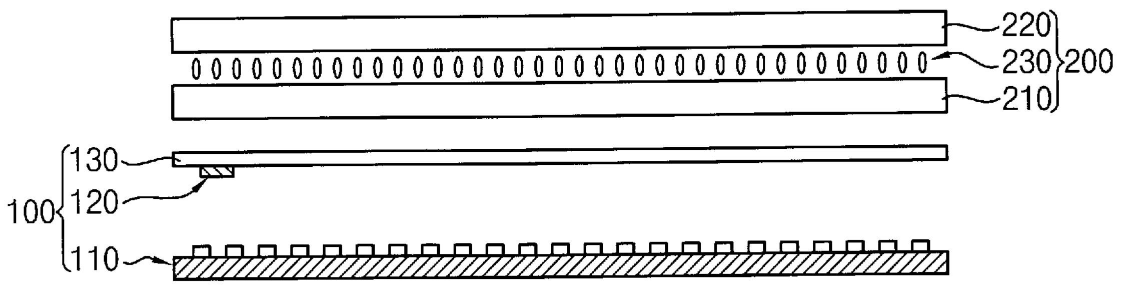
FIG. 1 is a cross-sectional view illustrating a display apparatus according to an embodiment of the present invention.

Embodiments of the present invention are described more fully hereinafter with reference to the accompanying drawings, in which example embodiments of the present invention are shown and described. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to," or "directly coupled to" another element or layer, there are no intervening elements or layers present. Like numerals refer to like elements throughout. As used herein, the term "and/or" includes any and all combinations of one or more of the associated listed items. It will be understood that, although the terms first, second, third, etc. may be used herein to describe, for example, various elements, components, regions, layers and/or sections, these elements, components, regions, layers and/or sections should not be limited by these terms. These terms may be used only to distinguish one element, component, region, layer, or section from another element, component, region, layer, or section. Thus, a first element, component, region, layer, or section discussed below could be termed a second element, component, region, layer, or section without departing from the teachings of the present invention. Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence, for example, of stated features, integers, steps, operations, elements, and/or components, but do not preclude the presence or addition of one or more other features, integers, steps, operations, elements, components, and/or groups thereof. Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Hereinafter, embodiments of the present invention will be explained in detail with reference to the accompanying drawings.

FIG. 1 is a cross-sectional view illustrating a display apparatus according to an embodiment of the present invention. Referring to FIG. 1, the display apparatus according to the present embodiment includes a backlight assembly 100 that may generate light and a display panel 200 that may display an image using light generated from the backlight assembly 100.

The backlight assembly 100 includes a light source unit 110 (e.g., optical unit), a light source controller 120, and an optical member 130. The light source unit 110 includes a plurality of light-emitting diodes (LEDs) generating light. The light source controller 120 detects white light generated from the LEDs, and controls the LEDs to maintain color coordinates of the white light to be substantially identical to reference color coordinates. The optical member 130 is disposed above the light source unit 110 to improve the quality of light generated from the LEDs. For example, the optical member 130 may include a diffusion sheet for diffusing light, or at least one prism sheet for increasing a front luminance of light.

The light source controller 120 is disposed on a lower surface of the optical member 130 facing the light source unit 110. For example, the light source controller 120 may be disposed at an edge of the lower surface of the optical member 130. When the light source controller 120 is disposed at the lower surface of the optical member 130, the light source controller 120 may more accurately detect light generated from the LEDs. In one embodiment, all of the light source controller 120 may be disposed on the lower surface of the optical member 130, but alternatively a part of the light source controller 120 may be disposed on the lower surface of the optical controller 130. That part of the light source controller 120 may be a light sensor capable of detecting light generated from the LEDs.

In the present embodiment, the light source controller 120 is not disposed on the lower surface of the optical member 130, but the light source controller 120 is disposed on the lower surface of the display panel 200 facing the light source unit 110. Also, the light source controller 120 is disposed on a mold frame (not shown) for supporting the optical member 130 and the display panel 200. Similarly, the light source controller 120 may be disposed in a location where light generated by the LEDs may be detected.

The display panel 200 includes a first substrate 210 facing the light source unit 110, a second substrate 220 facing the first substrate 210, and a liquid crystal layer 230 interposed between the first substrate 210 and the second substrate 220.

The first substrate 210 includes lines (not shown), thin-film transistors (TFTs) (not shown) electrically connected to the lines and pixel electrodes (not shown) electrically connected to the TFTs. The pixel electrodes are made of a transparent conductive material, and receive, through the TFTs, data voltages transmitted from the lines.

The second substrate 220 includes color filters (not shown) corresponding to the pixel electrodes and a common electrode (not shown) formed on the color filters. The color filters may include red, green, and blue color filters. The common electrode is made of a transparent conductive material and receives a common voltage.

The liquid crystal layer 230 is interposed between the first substrate 210 and the second substrate 220. When an electric field is formed between the pixel electrode and the common electrode, liquid crystal molecules of the liquid crystal layer 230 may be arranged in a direction perpendicular to the first substrate 210.

Figure 2:
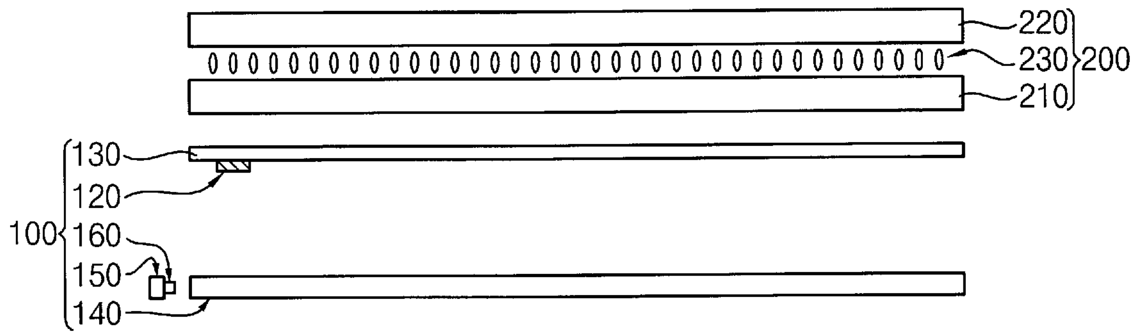
FIG. 2 is a cross-sectional view illustrating a display apparatus according to another embodiment of the present invention.

FIG. 2 is a cross-sectional view illustrating a display apparatus according to another embodiment of the present invention.

Referring to FIG. 2, the display apparatus according to the present embodiment includes a backlight assembly 300 that may generate light and a display panel 200 that may display an image using light generated from the backlight assembly 300.

Since components of the backlight assembly 300 according to FIG. 2 is the same to the components of the backlight assembly 100 according to FIG. 1, excepting for an edge type light source, an explanation for the same components will be omitted.

The backlight assembly 300 includes a light guide plate 140, a light source substrate 150, a light source 160 (e.g., optical unit), a light source controller 120, and an optical member 130. The light guide plate 140 receives the light from the light source 160 to guide the light to the display panel 200. The light source substrate 150 supports the light source 160 to provide the light to the edge of the light guide plate 140. The light source 160 includes a plurality of light-emitting diodes (LEDs) generating light. The light source controller 120 detects white light generated from the LEDs, and controls the LEDs to maintain color coordinates of the white light to be substantially identical to reference color coordinates. The optical member 130 is disposed above the light source unit 110 to improve the quality of light generated from the LEDs. For example, the optical member 130 may include a diffusion sheet for diffusing light, or at least one prism sheet for increasing a front luminance of light.

Figure 3:
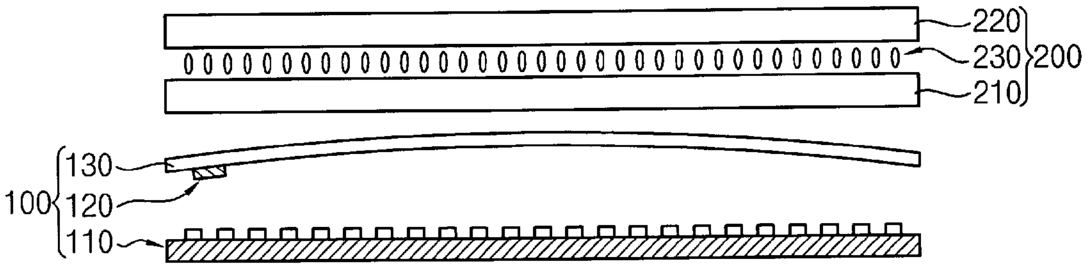
FIG. 3 is a cross-sectional view illustrating a warped state of an optical member of the display apparatus of FIG. 1 according to an embodiment.

FIG. 3 is a cross-sectional view illustrating a warped state of an optical member of the display apparatus of FIG. 1 in accordance with an embodiment. Referring to FIG. 3, the display apparatus according to the present embodiment may be affected by external conditions such as temperature or humidity. For example, the display apparatus may be used in a notebook computer. As such, the optical member 130, below which the light source controller 120 is attached, may become warped due to external conditions. When, as seen in FIG. 3, a center part of the optical member 130 becomes warped toward the display panel 200, and an edge part of the optical member 130 becomes warped toward the light source unit, the light source controller 120 disposed in the edge part of the optical member 130 may detect a larger amount of light generated from the LEDs.

Figure 4:
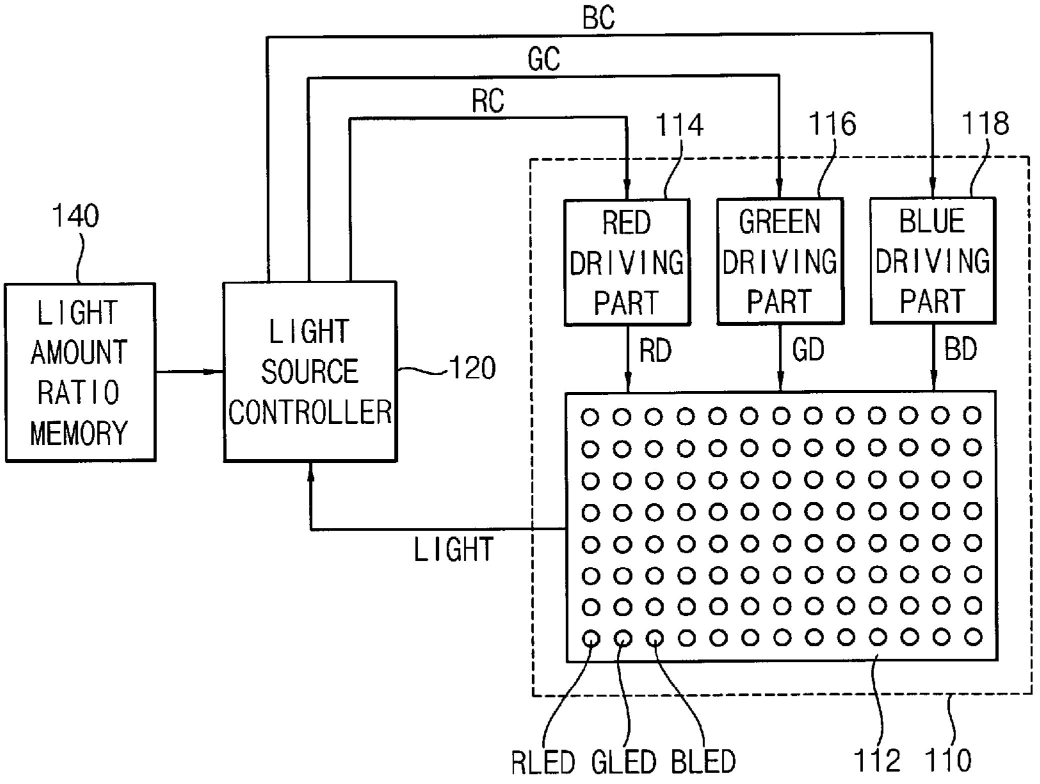
FIG. 4 is a block diagram illustrating the principle of driving the backlight assembly of FIG. 1 according to an embodiment.

FIG. 4 is a block diagram illustrating the principle of driving the backlight assembly of FIG. 1 in accordance with an embodiment. Referring to FIGS. 1 and 4, the light source unit 110 includes a driving substrate 112, LEDs disposed on the driving substrate 112 to generate light, and a diode driving part driving the LEDs. The LEDs may be disposed on the driving substrate 112, in a matrix form. The LEDs include a red LED RLED generating red light, a green LED GLED generating green light, and a blue LED BLED generating blue light.

The diode driving part includes a red driving part 114 providing a red driving signal RD to the red LED RLED to control the driving of the red LED RLED, a green driving part 116 providing a green driving signal GD to the green LED GLED to control the driving of the green LED GLED, and a blue driving part 118 providing a blue driving signal BD to the blue LED BLED to control the driving of the blue LED BLED. The diode driving part may not only be disposed on the driving substrate 112, but also disposed on other components.

The light source controller 120 detects the red light generated from the red LED RLED, the green light generated from the green LED GLED, and the blue light generated from the blue LED BLED, respectively, and feedback-controls the light source unit 110, using data referring to an amount of each color light. For example, the light source controller 120 outputs a red control signal RC for controlling the red driving part 114, a green control signal GC for controlling the green driving part 116, and a blue control signal BC for controlling the blue driving part 118. In one embodiment, the red, green, and blue control signals RC, GC, and BC may, for example, be pulse-width modulated.

The light source controller 120 compares an actual light amount ratio of the amounts of light of the detected red, green, and blue light with a reference light amount ratio. As a result of comparison, when the actual light amount ratio is not identical to the reference light amount ratio, the light source controller 120 changes the duty (e.g., duty cycle) of the red, green, and blue control signals RC, GC, and BC, so that the actual light amount ratio becomes substantially identical to the reference light amount ratio. Likewise, the red, green, and blue control signals RC, GC, and BC, which have the changed duty, control the red, green, and blue driving parts 114, 116, and 118, respectively, so that the light source controller 120 may control the driving of the red, green, and blue LEDs RLED, GLED, and BLED, respectively.

Alternatively, in the present embodiment, the backlight assembly 100 may further include a light amount ratio memory 140 storing the reference light amount ratio and providing the reference light amount ratio to the light source controller 120 when the light source controller 120 requires the reference light amount ratio. In this embodiment, the light amount ratio memory 140 that is separate from the light source controller 120 is described; the light amount ratio memory 140 may, however, be built into the light source controller 120.

The reference light amount ratio is a ratio of amounts of the red, green, and blue light corresponding to reference white color coordinates. For example, the reference white color coordinates may be values in an XY color coordinate system (0.313, 0.329). Alternatively, the reference light amount ratio may be about 5:8:3 sequentially corresponding to the red, green, and blue light. An error range, for example, of the ratio of the amount of each color light may be a maximum of ±1%. When the ratio of the amount of light goes out of the error range, a change of the white color coordinates may be visually recognized. For example, when the reference light amount ratio is A:B:C sequentially corresponding to the red, green, and blue light, the range of "A" of the reference light amount ratio may be about 4.95 to about 5.05, the range of "B" of the reference light amount ratio may be about 7.92 to about 8.08, and the range of "C" of the reference light amount ratio may be about 2.97 to about 3.03. For example, the reference light amount ratio may be 0.625:1.000:0.375 sequentially corresponding to the red, green, and blue light.

Figure 5:
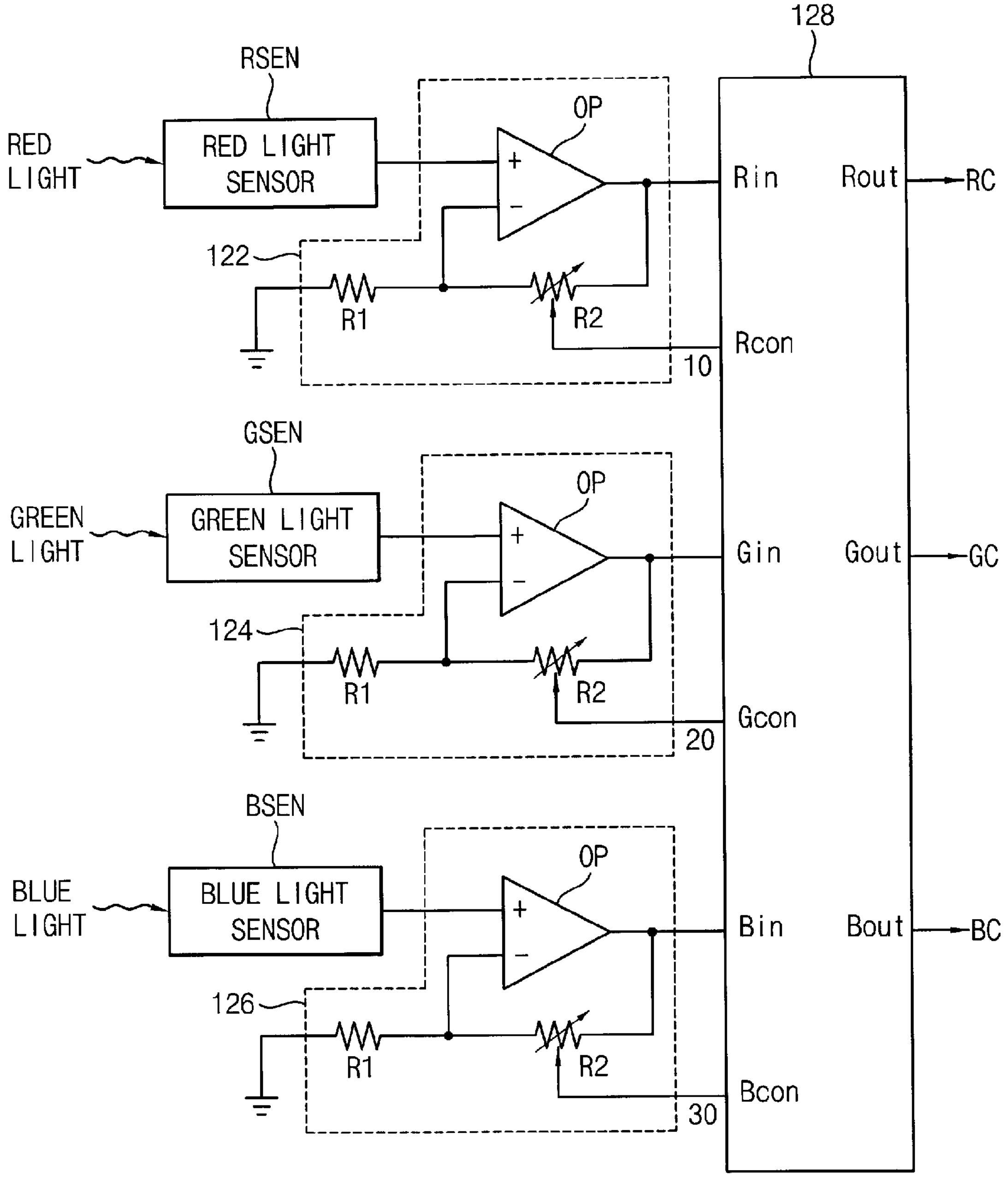
FIG. 5 is an enlarged circuit diagram illustrating a light source controller of the backlight assembly of FIG. 4 according to an embodiment.

FIG. 5 is an enlarged circuit diagram illustrating a light source controller of the backlight assembly of FIG. 4 in accordance with an embodiment. Referring to FIGS. 4 and 5, the light source controller 120 may include a light sensor, a light sensor amplification part, and a controller element 128.

The light sensor includes a red light sensor RSEN, which detects the red light generated from the red LED RLED to output the amount of light of the red light as an analog value, a green light sensor GSEN, which detects the green light generated from the green LED GLED to output the amount of light of the green light as an analog value, and a blue light sensor BSEN, which detects the blue light generated from the blue LED BLED to output the amount of light of the blue light as an analog value. The red, green, and blue light sensors RSEN, GSEN, and BSEN may be, for example, photodiodes. The sensitivity of the photodiodes may be about 0.001 V/lux. The light sensor amplification part includes a red sensing amplification part 122 connected to the red light sensor RSEN, a green sensing amplification part 124 connected to the green light sensor GSEN, and a blue sensing amplification part 126 connected to the blue light sensor BSEN. The red sensing amplification part 122 amplifies the analog value of the amount of light measured in the red light sensor RSEN to a certain magnification to output the amplified analog value. The green sensing amplification part 124 amplifies the analog value of the amount of light measured in the green light sensor GSEN to a certain magnification to output the amplified analog value. The blue sensing amplification part 126 amplifies the analog value of the amount of light measured in the blue light sensor BSEN to a certain magnification to output the amplified analog value. Here, the amplification magnification of the red, green, and blue sensing amplification parts 122, 124, and 126 may be substantially the same as each other.

Each of the red, green, and blue sensing amplification parts 122, 124, and 126 may include an operational amplifier OP, a first resistor R1, and a second resistor R2. The operational amplifier OP includes a first input terminal connected to the respective sensor to receive the analog value of the amount of the respective color of light. The first resistor R1 is connected between a second input terminal of the operational amplifier OP and a ground terminal. The first input terminal has a "+" polarity, and the second input terminal has a "–" polarity for this example. The second resistor R2 is connected between the second input terminal of the operational amplifier OP and an output terminal of the operational amplifier OP. The output terminal of the operational amplifier OP is connected to one of red, green, and blue input terminal Rin, Gin, Bin of the controller element 128.

The amplification magnification of each of the red, green, and blue sensing amplification parts 122, 124, and 126 is determined by the first resistor R1 and the second resistor R2. Specifically, the amplification magnification has a value of $\{1+(R2/R1)\}$. In the present embodiment, to change the amplification magnification, one of the first resistor R1 and the second resistor R2 may be a digital resistor having a resistance value changed by a digital control signal. For example, the second resistor R2 may be the digital resistor, and the first resistor R1 may be a general resistor having a fixed resistance value. The second resistor R2 may be controlled by one of the red, green, and blue amplification control signals 10, 20, and 30 output from the red, green, and blue amplification control terminals Rcon, Gcon, Bcon of the controller element 128, so that the resistance value may be changed.

The controller element 128 receives through the red, green, and blue input terminals Rin, Gin, Bin the analog values of the amounts of the red, green, and blue light amplified in the red, green, and blue sensing amplification parts 122, 124, and 126 to convert the analog values into digital values. Afterward, the controller element 128 compares the actual light amount ratio of the converted digital values of the amounts of the red, green, and blue light with the reference light amount ratio stored in the light amount ratio memory 140. As a result of comparison, when the actual light amount ratio is not identical to the reference light amount ratio, the controller element 128 changes the duty of the red, green, and blue control signals RC, GC, and BC to output the control signals RC, GC, and BC through the red, green, and blue control output terminals Rout, Gout, and Bout, so that the actual light amount ratio becomes substantially identical to the reference light amount ratio.

Alternatively, the digital conversion values of the amounts of the red, green, and blue light converted from the analog values of the red, green, and blue light may be within a range of a number of reference bits. For example, the digital conversion values may be within a range of 10 bits. For example, as shown in FIG. 3, when the amounts of the red, green, and blue light detected from the red, green, and blue light sensors RSEN, GSEN, and BSEN is increased by the external conditions, the analog value of each color light output from the red, green, and blue sensing amplification parts 122, 124, and 126 may exceed 10 bits. Especially, the amount of the green light of the red, green, and blue light is relatively larger than the other. Only the analog value of the amount of the green light may exceed 10 bits. As a result, the digital conversion value with respect to the amount of the green light of the digital conversion values with respect to the amounts of the red, green, and blue light may be 1023, the largest 10-bit number. Accordingly, the ratio of the digital conversion values of the amounts of the red, green, and blue light may go out of the error range of the reference light amount ratio. As such, when the ratio of the digital conversion values goes out of the error range of the reference light amount ratio, the duties of the red, green, and blue control signals RC, GC, and BC may be converted so that the total of luminance is reduced although the red, green, and blue LEDs RLED, GLED, and BLED are properly driven.

Accordingly, when the actual light amount ratio, the ratio of the digital conversion values of the amounts of the red, green, and blue light is not the same as the reference light amount ratio, at least one of the analog values of the amounts of the red, green, and blue light is over the maximum of the reference analog values corresponding to the maximum of the digital values, so that at least one of the digital conversion values of the amounts of the red, green, and blue light is over the maximum of the digital values.

The controller element 128, according to the present embodiment, reduces the amplification magnification of the red, green, and blue sensing amplification parts 122, 124, and 126, so that at least one of the analog values of the amounts of the red, green, and blue light is not increased over the maximum of the reference analog values.

Specifically, the controller element 128 determines whether or not the digital conversion values exceed the maximum of the digital conversion values. As a result of the determination, when the controller element 128 determines that the digital conversion values exceed the maximum of the digital conversion values, the controller element 128 reduces the amplification magnification of the red, green, and blue sensing amplification parts 122, 124, and 126, so that the digital conversion values do not exceed the maximum of the digital conversion values. For example, the controller element 128 may output the red, green, and blue amplification control signals 10, 20, and 30 to reduce resistances of the second resistors R2 of the red, green, and blue sensing amplification parts 122, 124, and 126 and to increase resistances of the first resistor R1 of the red, green, and blue sensing amplification parts 122, 124, and 126. For example, when the digital conversion values are within the range of 10 bits, the maximum of the digital conversion values may be within a range of about 1000 to about 1023. When the maximum of the digital conversion values is 1000, the digital conversion values may be within a range of about 0 to about 1000.

Hereinafter, referring to FIGS. 1 to 5, a method of driving LEDs will be explained. The amounts of the red, green, and blue light generated from the red, green, and blue LEDs RLED, GLED, and BLED are detected, respectively. For example, the amounts of the red, green, and blue light may be detected by the red, green, and blue light sensors RSEN, GSEN, and BSEN. The detected analog values of the amounts of the red, green, and blue may be amplified at substantially the same rate. For example, the analog values may be amplified by the red, green, and blue sensing amplification parts 122, 124, and 126. The amplified analog values of the amounts of the red, green, and blue light may be converted into digital values. Whether or not the converted digital values exceed the maximum of the digital values may be determined.

As a result of the determination, when the digital values are below the maximum of the digital values, the ratio of the amounts of the red, green, and blue light, that is, the actual light amount ratio, is compared with the reference light amount ratio. When the actual light amount ratio is not identical to the reference light amount ratio, the duties of the red, green, and blue control signals RC, GC, and BC for respectively controlling the red, green, and blue LEDs RLED, GLED, and BLED are converted, so that the actual light amount ratio becomes substantially identical to the reference light amount ratio. In addition, when the digital values have a value exceeding the maximum of the digital value, the amplification magnification, in which the analog values of the amounts of the red, green, and blue light is amplified, is reduced, so that the digital values are below the maximum of the digital values.

According to the present embodiment, an actual ratio of amounts of red, green, and blue light is compared with a reference light amount ratio so that the actual light amount ratio becomes substantially identical to the reference light amount ratio. Therefore, the luminance of light emitted from a light source unit may be prevented from being reduced, while white color coordinates are maintained.

Also, analog values of the amounts of the red, green, and blue light are amplified, and the amplified analog values are converted into digital values. Whether or not the digital values exceed the maximum of the digital values is determined. As a result of the determination, when the digital values exceed the maximum of the digital values, a controller element may control the amplification magnification of the analog values to be reduced so that the digital values are below the maximum of the digital values. Accordingly, although a display apparatus may become warped due to external conditions so as to excessively increase the detected amount of light, a backlight assembly according to an embodiment may maintain the actual light amount ratio of the red, green, and blue light to be substantially identical to the reference light amount ratio.

The foregoing embodiments are illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of embodiments of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A method of driving light-emitting diodes (LEDs), the method comprising:
- detecting amounts of red, green, and blue light generated from a red LED, a green LED, and a blue LED, respectively;
- determining whether or not one of the amounts of red, green, and blue light is over a maximum value of predetermined digital conversion values; and
- controlling the red, green, and blue LEDs so that the amounts of red, green, and blue light are less than the maximum value of predetermined digital conversion values,
- wherein the controlling the red, green, and blue LEDs includes reducing the amounts of red, green, and blue light to maintain a same ratio as before controlling.

2. The method of claim 1, wherein the determining whether or not the one of the amounts of red, green, and blue light is over a maximum value of predetermined digital conversion values comprises:
- converting analog values of the amounts of the red, green, and blue light into digital conversion values of the amounts of the red, green, and blue light, respectively; and
- determining whether or not one of the digital conversion values is over the maximum value of predetermined digital conversion values by comparing the digital conversion values with the maximum value of predetermined digital conversion values.

3. The method of claim 2, wherein the controlling the red, green, and blue LEDs so that the amounts of red, green, and blue light are less than the maximum value of predetermined digital conversion values comprises:
- reducing at least one of the digital conversion values of the red, green, and blue light to have a value less than the maximum value of predetermined digital conversion values.

4. The method of claim 3, wherein the controlling the red, green, and blue LEDs so that the amounts of red, green, and blue light are less than the maximum value of predetermined digital conversion values comprises:

changing a resistance of a first resistor connected between a second input terminal of an operational amplifier and a ground terminal or changing a resistance of a second resistor connected between the second input terminal of the operational amplifier and an output terminal of the operational amplifier.

5. The method of claim 4, wherein the changing the resistance comprises: decreasing the resistance of the second resistor and increasing the resistance of the first resistor.

6. The method of claim 4, wherein the changing the resistance of the second resistor comprises: decreasing the resistance of the second resistor.

7. The method of claim 4, wherein the changing the resistance of the first resistor comprises: increasing the resistance of the first resistor.

8. The method of claim 2, wherein the controlling LEDs so that the amounts of red, green, and blue light are less than the maximum value of predetermined digital conversion values comprises:

changing a resistance of a first resistor connected between a second input terminal of an operational amplifier and a ground terminal or changing a resistance of a second resistor connected between the second input terminal of the operational amplifier and an output terminal of the operational amplifier.

9. The method of claim 8, wherein the changing the resistance comprises: decreasing the resistance of the second resistor and increasing the resistance of the first resistor at the same time.

10. The method of claim 8, wherein the changing the resistance of the second resistor comprises: decreasing the resistance of the second resistor.

11. The method of claim 8, wherein the changing the resistance of the first resistor comprises: increasing the resistance of the first resistor.

12. The method of claim 1, wherein the controlling LEDs so that the amounts of red, green, and blue light are less than the maximum value of predetermined digital conversion values comprises:

changing a resistance of a first resistor connected between a second input terminal of an operational amplifier and a ground terminal or changing the resistance of a second resistor connected between the second input terminal of the operational amplifier and an output terminal of the operational amplifier.

13. The method of claim 12, wherein the changing the resistance comprises: decreasing the resistance of the second resistor and increasing the resistance of the first resistor.

14. The method of claim 12, wherein the changing the resistance of the second resistor comprises: decreasing the resistance of the second resistor.

15. The method of claim 12, wherein the changing the resistance of the first resistor comprises: increasing the resistance of the first resistor.

16. A backlight assembly comprising:

a light source unit comprising red, green, and blue LEDs generating red, green, and blue light, respectively; and a light source controller comprising:

a light sensor;

an operational amplifier connected to the light sensor having a first resistor connected between a second input terminal of the operational amplifier and a ground terminal and a second resistor connected between the second input terminal of the operational amplifier and an output terminal of the operational amplifier; and a controller element connected to the operational amplifier and controlling amplification magnification of the red, green, and blue LEDs so that digital conversion values of amounts of the red, green, and blue light do not exceed a maximum value of predetermined digital conversion values, wherein at least one of the first resistor and second resistor is a digital resistor having a resistance value changeable by a digital control signal, and wherein the digital conversion values of amounts of the red, green, and blue light is reduced to maintain a same ratio as before reducing, and the digital conversion values of amounts of the red, green, and blue light do not exceed the maximum value of predetermined digital conversion values.

17. The backlight assembly of claim 16, wherein the first and the second resistor are digital resistors.

18. The backlight assembly of claim 16, wherein the second resistor is the digital resistor and the first resistor is a general resistor having fixed resistance.

19. The backlight assembly of claim 16, wherein the first resistor is the digital resistor and the second resistor is a general resistor having fixed resistance.

* * * * *